United States Patent
Huang et al.

(10) Patent No.: US 8,855,111 B2
(45) Date of Patent: Oct. 7, 2014

(54) COMMUNICATION DEVICE WITH ENERGY SAVING MODE AND METHOD THEREOF

(75) Inventors: Liang-Wei Huang, Hsinchu (TW); Ta-Chin Tseng, Taipei County (TW); Ming-Feng Hsu, Taipei (TW); Yuan-Jih Chu, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 97 days.

(21) Appl. No.: 13/336,713

(22) Filed: Dec. 23, 2011

(65) Prior Publication Data

US 2012/0163243 A1    Jun. 28, 2012

(30) Foreign Application Priority Data

Dec. 28, 2010   (TW) .............................. 99146244 A

(51) Int. Cl.
*H04L 12/50*   (2006.01)
*H04L 12/413*   (2006.01)

(52) U.S. Cl.
CPC .................................. *H04L 12/413* (2013.01)
USPC ........... 370/379; 370/383; 370/384; 370/385; 370/389

(58) Field of Classification Search
CPC ..... H04L 12/525; H04L 49/901; H04L 12/56; H04L 12/413
USPC .................................. 370/379, 383–385, 389
See application file for complete search history.

(56) References Cited

U.S. PATENT DOCUMENTS

| | | | |
|---|---|---|---|
| 7,277,545 B1* | 10/2007 | Shim | 380/239 |
| 2006/0120269 A1* | 6/2006 | Kim et al. | 370/208 |
| 2006/0223454 A1* | 10/2006 | Westwick et al. | 455/76 |
| 2009/0046593 A1* | 2/2009 | Ptasinski et al. | 370/252 |
| 2010/0113088 A1* | 5/2010 | Erceg et al. | 455/552.1 |
| 2010/0226366 A1* | 9/2010 | Lee et al. | 370/389 |
| 2012/0011217 A1 | 1/2012 | Weng et al. | |
| 2012/0137151 A1 | 5/2012 | Huang et al. | |

* cited by examiner

*Primary Examiner* — Ricky Ngo
*Assistant Examiner* — Lan Huong Truong
(74) *Attorney, Agent, or Firm* — Birch, Stewart, Kolasch & Birch, LLP

(57) ABSTRACT

A communication device has a transmitting circuit, a receiving circuit, and a controller. The transmitting circuit transmits a first data to a transmission line. The first data is generated by a first scrambler wherein the values of the registers of the first scrambler are characterized by a first combination number. The receiving circuit receives a second data scrambled by a second scrambler from the transmission line. The first and the second scramblers have the same scrambler generator polynomial. The receiving circuit has a descrambler having a plurality of registers for descrambling the second data. The values of the registers of the second scrambler are characterized by a second combination number when the descrambler descrambles the second data. The controller configures the values of the registers of the first scrambler according to the first combination number, the second combination number, and/or a difference between the first and the second combination numbers.

16 Claims, 4 Drawing Sheets

COMMUNICATION DEVICE WITH ENERGY SAVING MODE AND METHOD THEREOF

CROSS-REFERENCE TO RELATED APPLICATIONS

This application claims the benefit of priority to Taiwanese Patent Application No. 099146244, filed on Dec. 28, 2010; the entirety of which is incorporated herein by reference for all purposes.

BACKGROUND

The present disclosure generally relates to communication devices and methods and, more particularly, to the full duplex communication device with the energy saving mode and the communication method thereof.

Nowadays, many electronic devices adopt the energy saving mechanism for utilizing the power more wisely, extending the battery usage time of the portable devices, and therefore achieving better environmental protection. For example, the Energy Efficient Ethernet (EEE) standard, developed by the IEEE 802.3az task force, defines several mechanisms for reducing the power consumption. During the periods of low data activity, the EEE-compatible transceivers may enter the power saving mode (a.k.a., the quiet mode, the sleep mode, the energy saving mode, etc.) and stop sending idle signals. The energy for sending idle signals in the power saving mode may therefore be saved.

In the High-Definition Multimedia Interface (HDMI), the fast Ethernet technology, i.e., 100BASE-TX of the IEEE 802.3u standard, is used in the HDMI Ethernet Channel (HEC) communication. Conventional 100BASE-TX transceivers may be modified to be compatible with the EEE standard with some changes. The HEC transceivers, although using the similar technology with 100 BASE-TX transceivers, may not be compatible with the EEE standard for several reasons.

For example, although both the 100BASE-TX transceivers and the HEC transceivers may operate in the full duplex mode, the 100BASE-TX transceiver trans-mits signals on one twisted pair of conductors and receives signals on another twisted pair of conductors. On the other hand, the HEC transceiver may transmit and receive signals on the same twisted pair of conductors simultaneously. When the near-end HEC transceiver receives the signals transmitted from the far-end HEC transceiver, the near-end HEC transceiver therefore may also receive the signals transmitted by itself. When the near-end HEC transceiver and the far-end HEC transceiver transmit the same signals, both HEC transceivers may not differentiate the near-end signals and the far-end signals and therefore fail to function correctly.

Besides, in the idle mode or in the connection establishment process, the HEC transceivers on both ends need to transmit idle signals. The HEC transceivers continuously and repeatedly transmit the pseudo random code of several thousand bits as the idle signals. The HDMI standard does not adopt the master-slave mechanism and does not require the near-end and the far-end HEC transceivers to use different scramblers. Thus, in the idle mode or in the connection establishment process, the near-end and the far-end HEC transceivers may transmit the same idle signals and therefore fail to function correctly.

Moreover, although the HEC transceivers shall transmit the signals with a 125 MHz frequency, there still may be a difference existed between the transmission frequencies of the transceivers on both ends. For example, a difference with ±200 ppm of the transmission frequency is tolerable in some technical standards. Therefore, even if the near-end and the far-end HEC transceivers are configured to transmit the idle signals from different positions of the same pseudo random code, the difference between the transmission frequencies may still cause the near-end and the far-end HEC transceivers to transmit the same idle signals after a period of time. The HEC transceivers may still fail to function correctly in this configuration.

Furthermore, if the HEC transceivers are to support the EEE function, the HEC transceivers shall avoid transmitting the same idle signals after leaving the power saving mode, which may cause the malfunction of the HEC transceivers.

SUMMARY

In view of the foregoing, it can be appreciated that a substantial need exists for methods and apparatuses that can mitigate or reduce the problems in the communication process.

An example embodiment of a communication device, comprising: a transmitter, for transmitting to a transmission line a first data generated by a first scrambler with a plurality of first registers characterized by a first combination number; a receiver, for receiving from the transmission line a second data generated by a second scrambler, comprising a descrambler for descrambling the second data with a plurality of second registers characterized by a second combination number; and a controller, coupled to the transmitter and the receiver, for adjusting the values of the first registers according to the first combination number, the second combination number, and/or a first combination number difference between the first combination number and the second combination number; wherein the first scrambler and the second scrambler have the same scrambler generator polynomial.

Another example embodiment of a communication device, comprising: a transmitter, for transmitting to a transmission line a first data generated by a first scrambler with a plurality of first registers characterized by a first combination number according to a oscillating signal generated by an oscillation circuit; a receiver, for receiving from the transmission line a second data generated by a second scrambler of a transceiver, comprising a descrambler for descrambling the second data with a plurality of second registers characterized by a second combination number; and a controller, coupled to the transmitter and the receiver, for configuring the oscillation circuit for adjusting the frequency of the oscillating signal so that a frequency difference existed between the frequency of the oscillating signal and a transmission frequency of the transceiver when a combination number difference between the first combination number and the second combination number locates in a predetermined range and/or equals to a predetermined value; wherein the first scrambler and the second scrambler have the same scrambler generator polynomial.

An example embodiment of a communication method, comprising: transmitting to a transmission line a first data generated by a first scrambler with a plurality of first registers characterized by a first combination number; receiving from the transmission line a second data generated by a second scrambler; descrambling the second data with a descrambler with a plurality of second registers characterized by a second combination number; and adjusting the values of the first registers according to the first combination number, the second combination number, and/or a first combination number difference between the first combination number and the second combination number.

An example embodiment of a communication method, comprising: transmitting to a transmission line a first data generated by a first scrambler with a plurality of first registers characterized by a first combination number according to a oscillating signal generated by an oscillation circuit; receiving from the transmission line a second data generated by a second scrambler of a transceiver; descrambling the second data with a descrambler with a plurality of second registers characterized by a second combination number; and configuring the oscillation circuit for adjusting the frequency of the oscillating signal so that a frequency difference existed between the frequency of the oscillating signal and a transmission frequency of the transceiver when a combination number difference between the first combination number and the second combination number locates in a predetermined range and/or equals to a predetermined value.

It is to be understood that both the foregoing general description and the following detailed description are example and explanatory only and are not restrictive of the disclosure, as claimed.

DETAILED DESCRIPTION

Reference will now be made in detail to embodiments of the disclosure, which are illustrated in the accompanying drawings. The same reference numbers may be used throughout the drawings to refer to the same or like parts or components/operations. Certain terms are used throughout the description and the claims to refer to particular components. As one skilled in the art will appreciate, a component may be referred by different names. This document does not intend to distinguish between components that differ in name but not in function. In the following description and in the claims, the terms "comprise" are used in an open-ended fashion, and thus should be interpreted to mean "include, but not limited to . . . ." The phrase "coupled with" is intended to compass any indirect or direct connection. Accordingly, if this document mentioned that a first device is coupled with a second device, it means that the first device may be directly or indirectly connected to the second device through electrical connections, wireless communications, optical communications, or other signal connections with/without other intermediate devices or connection means.

Figure 1:
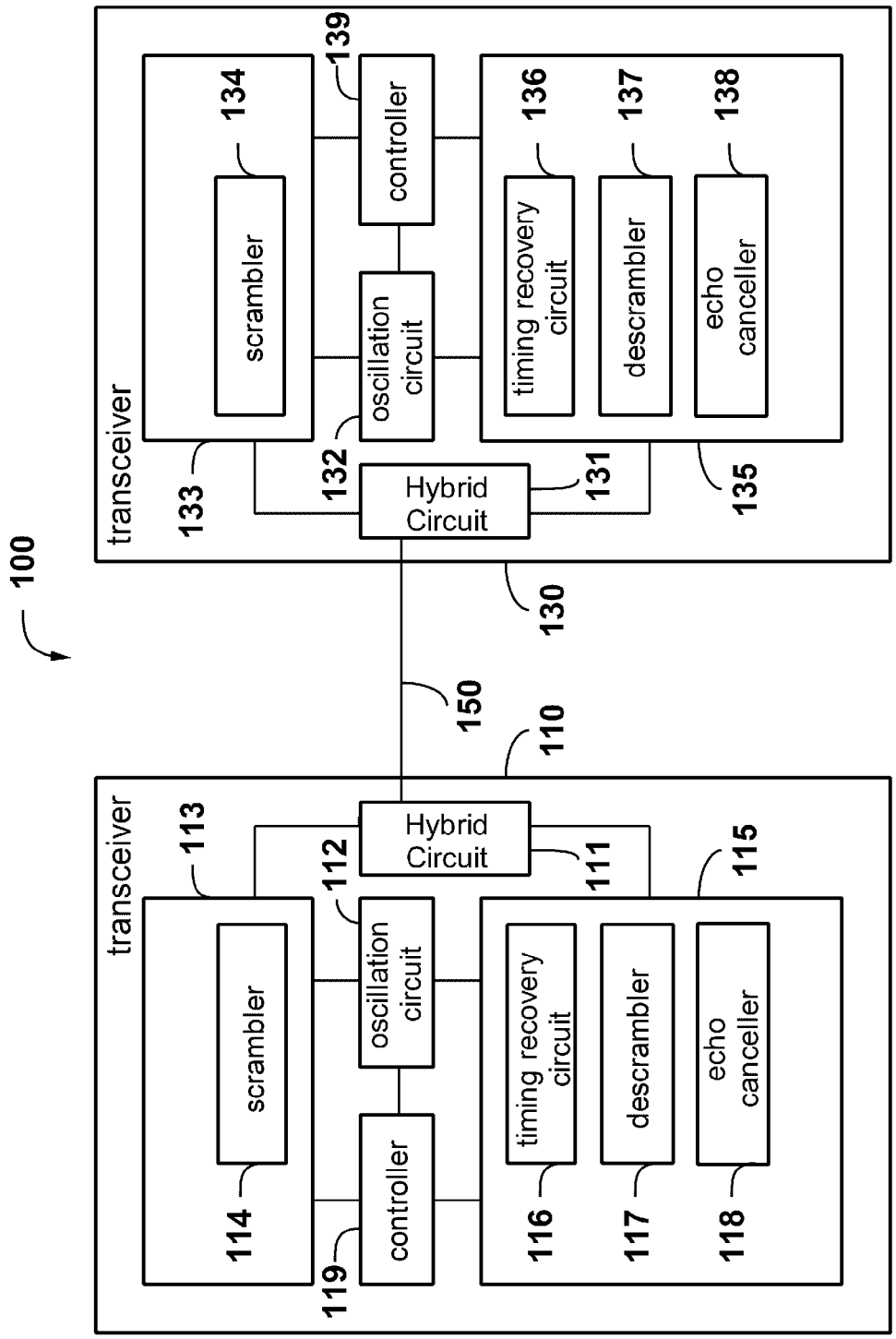
FIG. 1 is a simplified block diagram of an example communication system.

FIG. 1 shows a simplified block diagram of an example communication system 100, arranged in accordance with at least some embodiments of the present disclosure. The communication system 100 comprises a transceiver 110, a transceiver 130, and transmission lines 150. For example, the communication system 100 is an HDMI compatible system. The transceivers 110 and 130 are HEC transceivers of the HDMI transceiving devices and the transmission lines 150 are used for carrying the HEC signals and/or other signals in the HDMI cable.

In this embodiment, the transmission lines 150 are a pair of conductors for carrying differential signals. In another embodiment, the transmission lines 150 are used for carrying single-ended signals. For example, the transmission lines 150 may be realized with Cat-3~Cat-7 twisted pair cables, wirings on the printed circuit board, or other suitable conductors.

The transceiver 110 comprises a hybrid circuit 111, an oscillation circuit 112, a transmitter 113, a receiver 115, and a controller 119. The transmitter 113 comprises a scrambler 114. The receiver 115 comprises a timing recovery circuit 116, a descrambler 117, and an echo canceller 118. The transceiver 130 comprises a hybrid circuit 131, an oscillation circuit 132, a transmitter 133, a receiver 135, and a controller 139. The transmitter 133 comprises a scrambler 134. The receiver 135 comprises a timing recovery circuit 136, a descrambler 137, and an echo canceller 138. Other components, circuits, and connections are omitted in FIG. 1 for conciseness.

In this embodiment, the transmitter 113 of the transceiver 110 transmits signals to the transmission lines 150 through the hybrid circuit 111. The receiver 115 also receives the signals on the transmission lines 150 through the hybrid circuit 111. Because the transmission lines 150 carry the signals from the transmitter 113 of the transceiver 110 and the signals from the transmitter 133 of the transceiver 130, the receiver 115 may remove the signals from the transmitter 113 from the received signals by using the echo canceller 118.

The oscillation circuit 112 is used for generating the oscillating signal with a suitable frequency so that the transmitter 113, the receiver 115, and other components of the transceiver 110 may transmit or receive signals according to the oscillating signal. For example, when the transceivers 110 and 130 are HEC transceivers, the transceivers 110 and 130 shall transmit the signals with the frequency of 125 MHz. When the frequencies of the transceivers 110 and 130 are different, the oscillation circuit 112 and/or the oscillation circuit 132 may be configured to adjust the frequency of the oscillating signal. Thus, the frequencies of the transceivers 110 and 130 may be adjusted to be substantially the same and the transceivers 110 and 130 are synchronized.

The scrambler 114 of the transmitter 110 is used for scrambling the signals before signal transmission. The descrambler 117 is used for descrambling the received scrambled signals and generating the unscrambled signals. The architecture and operation of the scrambler 114 and the descrambler 117 are further described below accompanied with FIG. 2. Moreover, in this embodiment, the scrambler 114 of the transceiver 110 and the descrambler 134 of the transceiver 130 have the same generator polynomial.

The timing recovery circuit 116 is used for adjusting the timing for transmitting signals and/or receiving signals. For example, the timing recovery circuit 116 may provide the phase compensation and/or the frequency compensation so that the analog-to-digital converter (not shown in FIG. 1) of the receiver 115 may sample the signals at the moderate time. In one embodiment, the receiver 115 receives the signals transmitted by the transceiver 130 from the transmission lines 150. The timing recovery circuit 116 may estimate the frequency of the transceiver 130, i.e., the frequency of the oscillating signal generated by the oscillation circuit 132 of the transceiver 130, according to the signals received by the receiver 115.

The controller 119 is used to configure the transmitter 113, the receiver 114, and/or other components so that the transceiver 110 may transmit and receive signals correctly. For example, in the idle mode or in the connection establishment process, when the transceivers 110 and 130 transmit the same signal, the transceiver 110 and/or the transceiver 130 may not function correctly. Ideally, the input of the descrambler 117 and the output of the scrambler 134 have the same data. To avoid the malfunction of the transceiver 110, the controller 119 may monitor the output of the scrambler 114, the input of the descrambler 117, the registers of the scrambler 114, and/or the registers of the descrambler 117. The controller 119 may therefore detect whether the transceivers 110 and 130 transmit the same signals and configure relevant components correspondingly. The function of the controller 119 is explained in more details below.

The function and the connection of the components in the transceiver 130 are similar to the counterparts in the transceiver 110, and may be referred to the relevant descriptions above.

Figure 2:
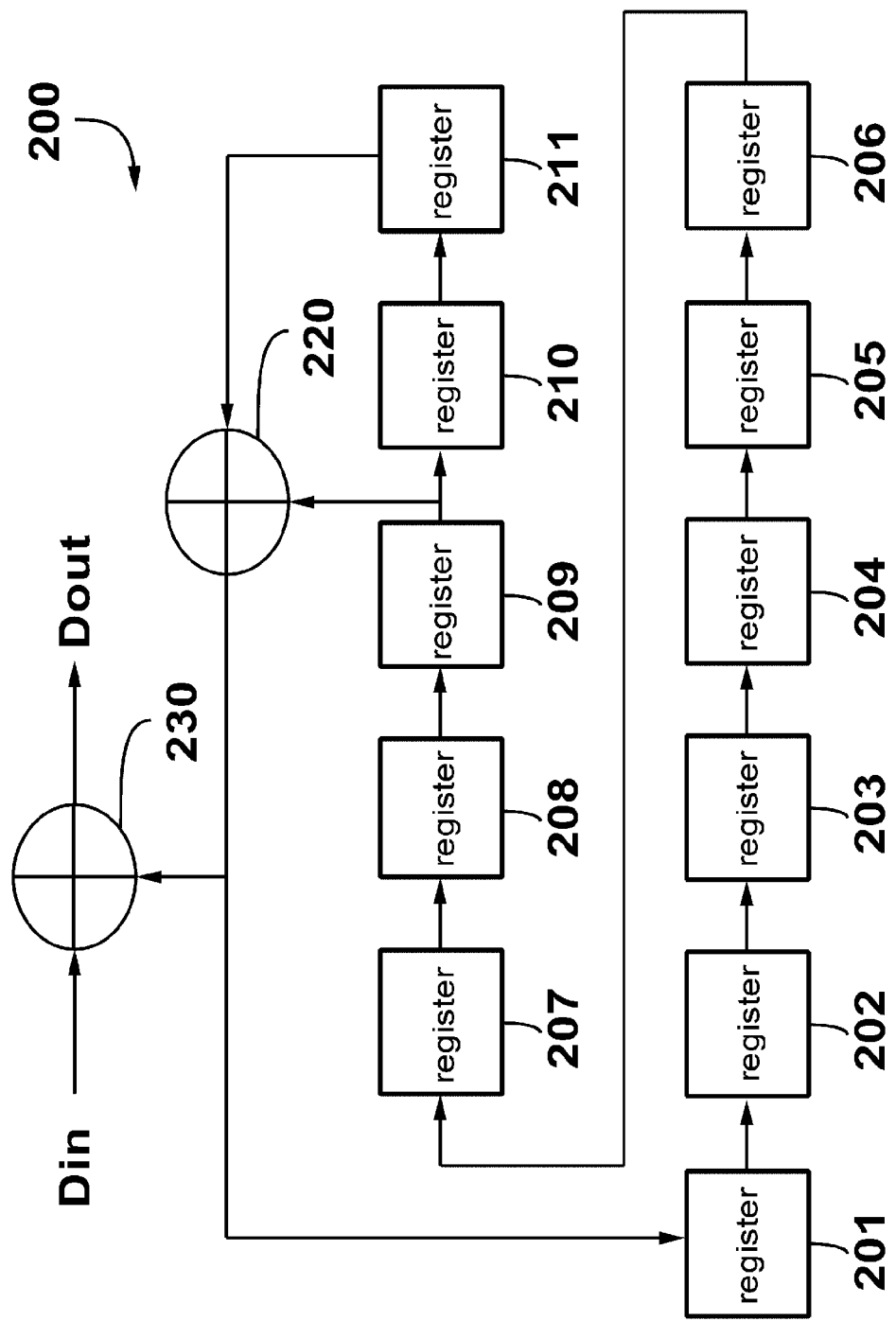
FIG. 2 is a simplified block diagram of an example scrambler/descrambler in FIG. 1.

The operation of the communication system 100 is further explained below accompanied with FIGS. 1 and 2. FIG. 2 shows a simplified block diagram of an example scrambler/descrambler 200, arranged in accordance with at least some embodiments of the present disclosure.

The scrambler/descrambler 200 in FIG. 2 is realized with the scrambler/descrambler architecture of the fast Ethernet 100BASE-TX transceiver. The scrambler/descrambler 200 may be used as a scrambler or a descrambler depending on the input data. When the input data Din are unscrambled data, the scrambler/descrambler 200 functions as a scrambler and outputs scrambled data Dout. When the input data Din are scrambled data, the scrambler/descrambler 200 functions as a descrambler and outputs unscrambled data Dout.

The scrambler/descrambler 200 comprises eleven shift registers 210~211, and two XOR (exclusive or) circuits 220 and 230. The scrambler generator polynomial and the descrambler generator polynomial are both $g(x)=1+x^9+x^{11}$.

The operation of the scrambler/descrambler 200 is described as follows. At time T, the input data Din(T) and the values of the shift registers 209 and 211 are processed by the XOR circuits 220 and 230, and output as the output Dout(T) of the scrambler/descrambler 200.

At time T+1, the values stored in the shift registers 201~210 at time T are stored in the shift register 202~211, respectively. For example, the value stored in shift register 203 at time T is stored in the shift register 204 at time T+1. The values stored in the shift registers 209 and 211 at time T are processed by the XOR circuit 220 and stored in the shift register 201 at time T+1. The input data Din(T+1) and the values of the shift registers 209 and 211 are processed by the XOR circuits 220 and 230 and output as the output Dout(T+1) of the scrambler/descrambler 200.

In this embodiment, the transceiver 110 is configured to transmit idle signals in the idle mode or in the connection establishment process. The transceiver 110 configures the input data Din to be the value "1" and configures the values of the shift registers 201~211 not to be all zeros. The values of the shift registers 201~211 have 2047 possible combinations, i.e., $2^{11}-1$ (except the all zeros situation), which cyclically appear. Accordingly, the output Dout of the scrambler/descrambler 200 has 2047 cyclically appeared values, a.k.a. the idle sequence.

In this embodiment, each of the 2047 cyclically appeared combinations of the values of the shift registers 201~211 is serially assigned to a unique number. For example, according to the operation of the scrambler/descrambler 200, when the values of the shift registers 201~211 are [11111111111], the combination number is assigned as 1. When the values of the shift registers 201~211 are [01111111111], the combination number is assigned as 2. By using this rule, when the values of the shift registers 201~211 are [11111111110], the combi-nation number is assigned as 2047. In another embodiment, another combination of the values of the shift registers 201~211 is assigned as the combination number 1 and the other combinations of the values of the shift registers 201~211 are respectively assigned to unique combination numbers according the operation of the scrambler/descrambler 200 or in other suitable order.

In the specification and the claims, when the combination number of the values of the shift registers 201~211 of the scrambler 114 is N, for the purpose of simplicity, it is referred that the combination number of the scrambler 114 is N. When the combination number of the scrambler 114 is N and the combination number of the descrambler 117 is M, the combination number difference between the scrambler 114 and the descrambler 117 is defined as the absolute value of (M−N).

In other embodiments, the combination number difference between the scrambler 114 and the descrambler 117 may also be defined as (N−M), (M−N), or (M−N) when M>=N and (M−N+2047) when M<N.

In another embodiment, the 2047 possible values are stored in the transceiver 110. The controller 119 compares the values of the shift registers of the scrambler 114 with the values of the 2047 combinations to obtain the combination number of the scrambler 114.

In another embodiment, only parts of the values of the 2047 combinations are stored in the transceiver 110. For example, the transceiver 110 only stores the values [11111111111]. The controller 119 calculates the processing time, the iteration number, the number of input bit(s) of the scrambler 114, and/or the number of output bit(s) of the scrambler 114 before the values of the shift registers of the scrambler 114 become [11111111111]. The controller 119 may directly use or process the calculated data above to obtain the combination number of the scramble 114.

In another embodiment, the 2047-bit cyclically appeared output data of the scrambler 114 corresponding to the combination numbers 1~2047 (i.e., the 2047-bit idle sequence) are stored in the transceiver 110. The controller 119 compares the output of the scrambler 114 with the 2047-bit idle sequence to obtain the combination number of the scrambler 114. For example, after comparing 11 bits output of the scrambler 114 with the 2047-bit idle sequence, the controller 119 finds the 11 bits output matches the $21^{st}$~$31^{st}$ bits of the 2047 idle sequence and determines the combination number of the scrambler 114 to be 31.

In another embodiment, only parts of the 2047-bit cyclically appeared output data of the scrambler 114 corresponding to the combination numbers 1~2047 are stored in the transceiver 110. For example, the transceiver 110 only stores the values [01111111111]. The controller 119 calculates the processing time, the iteration number, the number of input bit(s) of the scrambler 114, and/or the number of output bit(s) of the scrambler 114 before the output of the scrambler 114 become [01111111111]. The controller 119 may directly use or process the calculated data above to obtain the combination number of the scramble 114.

In another embodiment, the transceiver 110 may store the combination number of the scrambler 114 in the storage device. The content of the storage device may be updated accordingly and the calculation of the combination number of the scrambler 114 may be reduced or omitted.

The controller 119 may also adopt the above methods to obtain the combination number of the descrambler 117. The controller 119 may adopt the same or different method(s) to obtain the combination number of the scrambler 114 and the combination number of the descrambler 117.

In another embodiment, the combination number difference is needed. The controller 119 may calculate the processing time, the iteration number, the number of input bit(s) of the scrambler 114, and/or the number of output bit(s) of the scrambler 114 before the values of the shift registers of the scrambler 114 become the values of the shift registers of the descrambler 117. The controller 119 may directly use or process the calculated data above to obtain the combination number difference of the scrambler 114 and the descrambler 117.

In another embodiment, the controller 119 may calculate the processing time, the iteration number, the number of input bit(s) of the scrambler 114, and/or the number of output bit(s) of the scrambler 114 before the output data of the scrambler 114 become the output data of the descrambler 117. The controller 119 may directly use or process the calculated data above to obtain the combination number difference of the scrambler 114 and the descrambler 117.

In the embodiments in FIGS. 1 and 2, the transceivers 110 and 130 and the scrambler/descrambler 200 may be realized with controller(s), processor(s), specifically designed integrated/discrete circuit(s), and/or the collaboration of hardware and software. The components and the connections are illustrative only. Multiple functional blocks may be realized with a single component and a single functional block may be realized with multiple components. The architecture of each functional block may also be modified according to different design considerations. For example, the transceivers may be realized with scramblers, transmitters, and/or receivers of different architectures.

Figure 3:
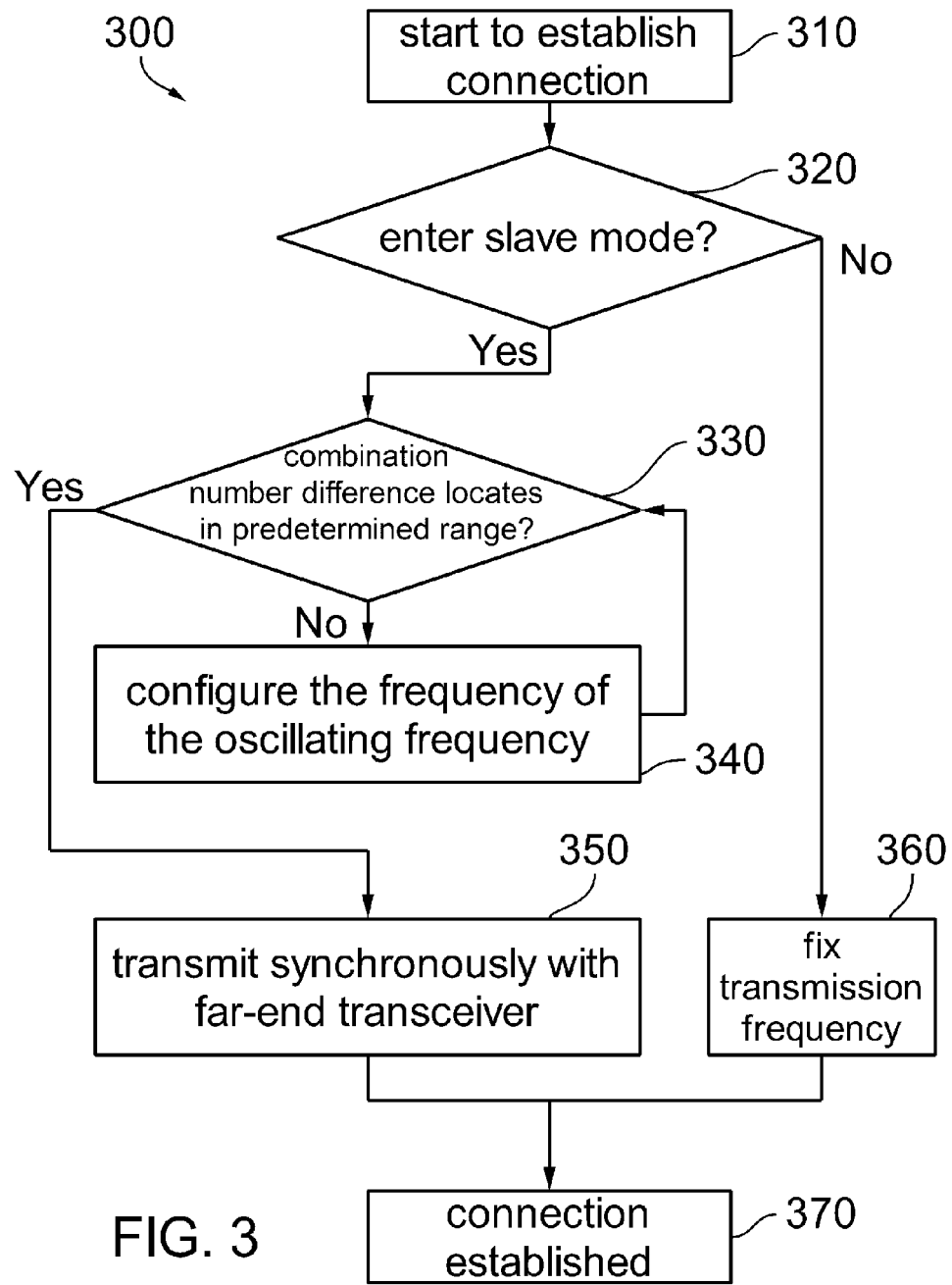
FIG. 3 is a simplified flowchart of an example connection establishing method.

The operation of the communication system 100 is further explained below accompanied with FIGS. 1-3. FIG. 3 shows a simplified flowchart of an example connection establishing method 300, arranged in accordance with at least some embodiments of the present disclosure.

In the operation 310, the transceivers 110 and 130 start to establish the connection. The transmitters 113 and 133 of the transceivers 110 and 130 both trans-mit idle signals.

In the operation 320, the controller 119 determines whether the transceiver 110 shall enter the slave mode according to various criterions. If the controller 119 configures the transceiver 110 to enter the slave mode, the method proceeds to the operation 330. Otherwise, the method proceeds to the operation 360.

In one embodiment of the operation 320, the controller 119 determines whether the transceiver 110 shall enter the slave mode according to the output of the scrambler 114, the values of the shift registers of the scrambler 114, the combination number of the scrambler 114, the input of the descrambler 117, the values of the shift registers of the descrambler 117, the combination number of the descrambler 117, and/or the computation result of the data above.

In the operation 330, the transceiver 110 enters the slave mode. The controller 119 calculates the combination number difference of the scrambler 114 and the descrambler 117. When the combination number difference of the scrambler 114 and the descrambler 117 locates in a predetermined range or equals to a predetermined value, the method proceeds to the operation 350. Otherwise, the method proceeds to the operation 340.

In one embodiment of the operation 330, the predetermined ranged is configured as half of the possible the combination numbers of the values of the shift registers of the scrambler 114 plus/minus the suitable value(s). For example, when the scrambler/descrambler 200 is adopted, the predetermined range may be configured as (1024-10)~(1024+10). In another embodiment of the operation 330, the predetermined ranged is configured as half of the possible the combination numbers of the values of the shift registers of the scrambler 114.

In the above two embodiments, the controller 119 configures the combination number difference of the scrambler 114 and the descrambler 117 to locate in the predetermined range or equal to the predetermined value so that the combination number difference of the scrambler 114 and the descrambler 117 may be enlarged. Thus, it is less likely that the scramblers 114 and 134 generate the same signals and therefore the transceivers 110 and 130 fail to function correctly.

In the operation 340, the controller 119 configures the oscillation circuit 112 to generate the oscillating signal, the frequency of which is different from the frequency of the oscillating signal generated by the oscillation circuit 132 by a frequency difference. By configuring the frequency difference between the oscillating signals generated by the oscillation circuits 112 and 132, the combination number difference of the scramblers 114 and 134 may be changed gradually. That is, the combination number difference of the scrambler 114 and the descrambler 117 may be changed gradually so that the combination number difference of the scrambler 114 and the descrambler 117 may locate in the predetermined range or equal to the predetermined value. Moreover, after a period of time and/or after transmitting certain number of bits, the method may proceed to the operation 330 so as to determine whether the combination number difference locates in the predetermined range or equals to the predetermined value.

In the operation 350, the controller 119 configures the oscillation circuit 112 to generate the oscillating signal, which follows the frequency of the oscillating signal generated by the oscillation circuit 132. The frequencies of the oscillating signals generated by the oscillation circuits 112 and 132 are substantially the same so that the transceivers 110 and 130 may transmit and receive signals synchronously.

In the operation 360, the controller 119 configures the oscillation circuit 112 to generate the oscillating signal of a fixed frequency so that the far-end transceiver 130 may follow the frequency of the oscillating signal generated by the oscillation circuit 112.

In the operation 370, the connection between the transceivers 110 and 130 are established.

In the description above, the method 300 is explained in the aspect of the transceiver 110. The method 300 may also be applied to the transceiver 130 to establish the connection between the transceivers 110 and 130.

In one embodiment, the timing recovery circuit 340 and the controller 119 are used in the operations 340 and 350 to process the received signals and estimate the frequency of the oscillating signal generated by the oscillation circuit 132.

In another embodiment, the control 119 configures the predetermined range or the predetermined value in the operation 330. When the combination number difference of the scrambler 114 and the descrambler 117 locates in the predetermined range or equal to the predetermined value, the method proceeds to the operation 340. Otherwise, the method proceeds to the operation 350. For example, when the combination number difference of the scrambler 114 and the descrambler 117 locates between 0~1023 or between 1025~2046, the method proceeds to the operation 340. The controller 119 configures the frequency of the oscillating signal generated by the oscillation circuit 112 so as to change the combination number difference of the scrambler 114 and the descrambler 117.

In another embodiment of the operation 340, the controller 119 configures the oscillation circuit 112 to adjust the frequency of the oscillating signal. For example, the combination number of the scrambler 114 is N, and the combination number of the descrambler 117 is M. The combination number difference of the scrambler 114 and the descrambler 117 is defined as the absolute value of (M−N) and ranges between 0~2046. The frequency of the oscillating signal generated by the oscillation circuit 132 is 125 MHz. When the combination number difference of the scrambler 114 and the descrambler 117 is 2000 and the predetermined value is 1024, the controller 119 may configure the frequency of the oscillating signal generated by the oscillation circuit 132 to be 125 MHz−1 ppm×125 MHz. Thus, the combination number difference of the scrambler 114 and the descrambler 117 may be gradually adjusted from 2000 to the predetermined value 1024. In this embodiment, the frequency difference between the oscillating signals generated by the oscillation circuits 112 and 132 is 1 ppm. In another embodiment, the controller 119 may configure the frequency of the oscillating signal generated by the oscillation circuit 132 to be 125 MHz+1 ppm×125 MHz. Thus, the combination number difference of the scrambler 114 and the descrambler 117 may be gradually adjusted from 2000 to the predetermined value 1024. The controller 119 may also choose other suitable values of frequency difference for adjusting the combination number difference.

Figure 4:
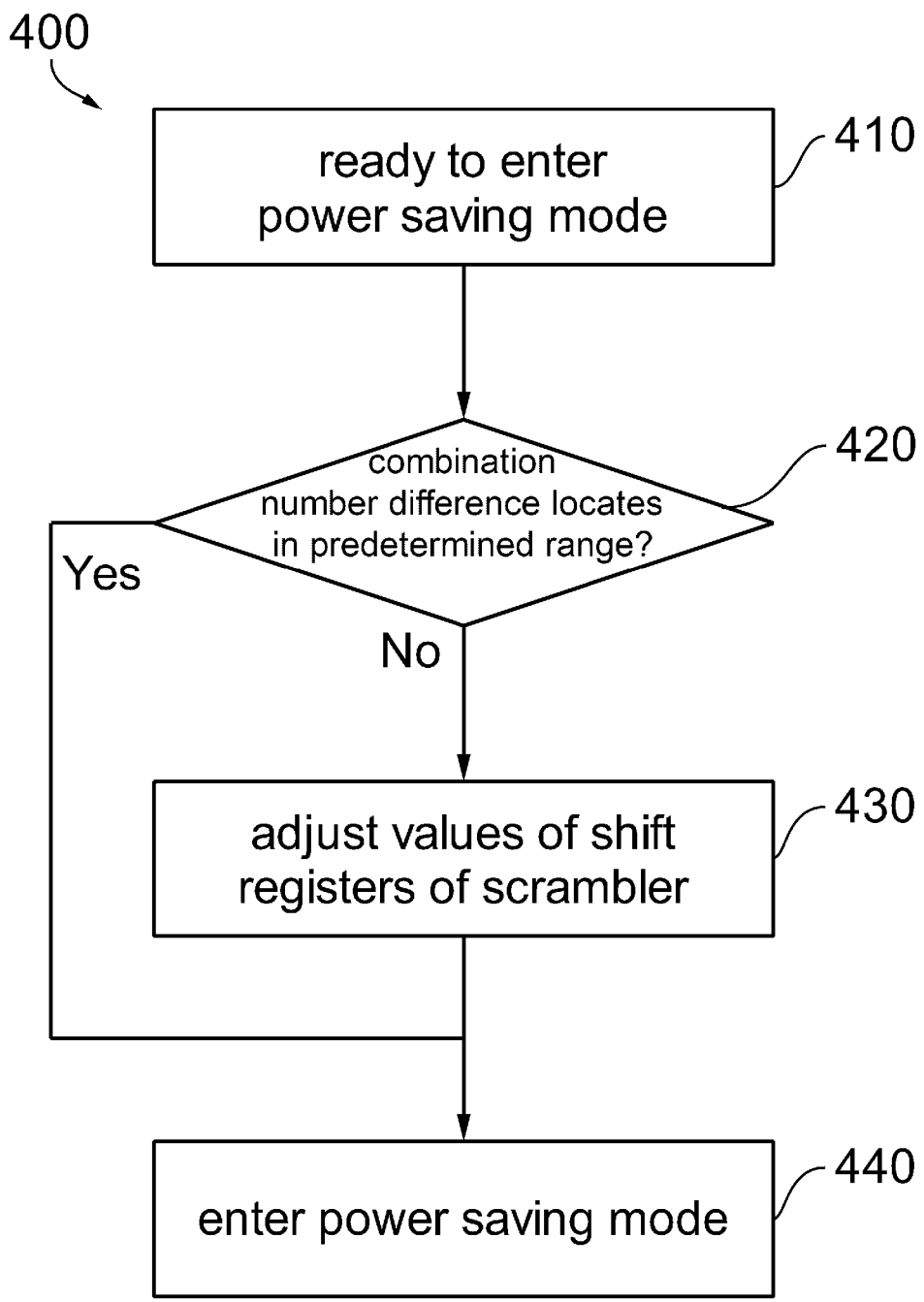
FIG. 4 is a simplified flowchart of an example power saving mode control method, all arranged in accordance with at least some embodiments of the present disclosure described herein.

The operation of the communication system 100 is further explained below accompanied with FIGS. 1, 2, and 4. FIG. 4 shows a simplified flowchart of an example power saving mode control method 400, arranged in accordance with at least some embodiments of the present disclosure.

In the operation 410, the transmitter 113 of the transceiver 110 is ready to enter the power saving mode.

In the operation 420, the controller 119 calculates the combination number difference of the scrambler 114 and the descrambler 117. When the combination number difference of the scrambler 114 and the descrambler 117 locates in the predetermined range or equals to the predetermined value, the method proceeds to the operation 440. Otherwise, the method proceeds to the operation 430.

In one embodiment of the operation 420, the predetermined range is configured as half of the possible the combination numbers of the values of the shift registers of the scrambler 114 plus/minus the suitable value(s). In another embodiment of the operation 420, the predetermined range is configured as half of the possible the combination numbers of the values of the shift registers of the scrambler 114.

In the operation 430, the controller 119 generates an adjustment value according to the combination number difference of the scrambler 114 and the descrambler 117 and the predetermined range/value. According to the adjustment value, the controller 119 configures the values of the shift registers of the scrambler 114 to be the values of the registers of another combination number. The adjusted combination number difference of the scrambler 114 and the descrambler 117 may therefore be closer to the predetermined range/value. After the controller 119 adjusts the values of the shift registers of the scrambler 114, the method proceeds to the operation 440.

In the operation 440, the transmitter 130 of the transceiver 110 transmits the signal(s) indicating the transceiver 110 enters the power saving mode. Then, the transceiver 110 enters the power saving mode.

In one embodiment of the operation 430, the controller 119 may configure the adjustment value to be half of the difference between a reference value and the combination number difference of the scrambler 114 and the descrambler 117. For example, when the combination number of the scrambler 114 is 1100 and the combination number of the scrambler 117 is 1300, the combination number difference of the scrambler 114 and the descrambler 117 is 200. Assuming the reference value is 1024, the adjustment value may be configured as (1024−200)×½=412. Thus, the controller 119 may configure the values of the registers of the scrambler 114 to be the values of the shift registers of the combination number 688, i.e., the combination number of the scrambler 114 (1100) minus the adjustment value (412). The adjusted combination number difference is therefore 612, which is closer to the predetermined difference value 1024 than the original combination number difference 200.

In the previous embodiment, the controller 119 may directly configures the values of the registers of the scrambler 114 to be the values of the combination number 688. In another embodiment, the method described in the operation 340 may also be applied in the operation 430. The controller 119 adjusts the oscillation circuit 112 so that there is a frequency difference between the oscillating signals of the oscillation circuits 112 and 132. Thus, the combination number difference of the scrambler 114 and the descrambler 117 may be adjusted from 200 to 612.

In another embodiment, the controller 119 may configure the predetermined range or the predetermined value in the operation 420. When the combination number difference of the scrambler 114 and the descrambler 117 locates in the predetermined range or equals to the predetermined value, the method proceeds to the operation 430. Otherwise, the method proceeds to the operation 440. For example, when the combination number difference of the scrambler 114 and the descrambler 117 locates between 0~1023 or between 1025~2046, the method proceeds to the operation 430. The controller 119 configures the values of the shift registers of the scrambler 114 so as to change the combination number difference of the scrambler 114 and the descrambler 117.

In another embodiment, the controller 119 may obtain the adjustment value according to one or more reference value(s) and the combination number difference of the scrambler 114 and the descrambler 117. The controller 119 may adjust the values of the shift registers of the scrambler 114 according to the adjustment value.

In the above embodiments, the combination number difference of the scrambler 114 and the descrambler 117 is defined as the absolute value of (M−N) to simplify the explanation. When the combination number difference is defined otherwise, the component(s) and algorithm(s) may still be properly modified to achieve the same or similar function.

The embodiments in FIGS. 1-4 may be separately or collaboratively implemented. In the above embodiments, the transceivers 110 and 130 may adopt the same or different method(s) to establish the connection. As long as one of the transceivers 110 and 130 adopts the above method(s), the network connection may be sustained more stably. The method(s) may be applied in the conventional devices and compatible with the existing industry standard and therefore the transceivers 110 or 130 possess very high compatibility.

According to the embodiments above, the controller 119 may adjust the frequency of the oscillating signal generated by the oscillation circuit 112 in the connection establishing process. The combination number difference of the scramblers 114 and 134 may be enlarged so that the transceivers 110 and 130 do not fail to function due to transmitting the same signals. Moreover, the controller 119 may adjust the frequency of the oscillating signal generated by the oscillation circuit 112 before the transmitter 130 enters the power saving mode. The combination number difference of the scramblers 114 and 134 may be enlarged so that the transceivers 110 and 130 do not fail to function due to transmitting the same signals after leaving the power saving mode.

Although the HEC transceivers are used as embodiments above, the present disclosure may be applicable to the communication systems, in which the transceivers on both ends may transmit the same signals on the same transmission lines at the same time. Therefore, the communication systems may maintain connection more stably.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A communication device, comprising:
    a transmitter, for transmitting to a pair of conductors of a transmission line a first data generated by a first scrambler with a plurality of first registers characterized by a first combination number;
    a receiver, for receiving from the pair of conductors of the transmission line a second data generated by a second scrambler, comprising a descrambler for descrambling the second data with a plurality of second registers characterized by a second combination number; and
    a controller, coupled to the transmitter and the receiver, for adjusting the values of the first registers according to the first combination number, the second combination number, and/or a first combination number difference between the first combination number and the second combination number;
    wherein the first scrambler and the second scrambler have the same scrambler generator polynomial, the controller configures the values of the first registers to be characterized by a third combination number when the first combination number difference locates in a predetermined range and/or equals to a predetermined value, there is a second combination number difference between the third combination number and the second combination number, and the difference between the second combination number difference and the predetermined range and/or the predetermined value is less than the difference between the first combination number difference and the predetermined range and/or the predetermined value.

2. The communication device of claim 1, wherein:
    the controller compares the values of the first registers and/or the first data with a first value for generating the first combination number;
    the controller compares the values of the second registers and/or the second data with a second value for generating the second combination number; and
    the controller generates the first combination number difference according to the first combination number and the second combination number.

3. The communication device of claim 1, wherein the first value and the second value are substantially the same.

4. The communication device of claim 1, wherein the controller compares the first data and the second data and/or compares the values of the first registers and the values of the second registers for generating the first combination number difference.

5. The communication device of claim 1, wherein the controller compares the first data and the values of the second registers and/or compares the values of the first registers and the second data for generating the first combination number difference.

6. A communication device, comprising:
    a transmitter, for transmitting to a pair of conductors of a transmission line a first data generated by a first scrambler with a plurality of first registers characterized by a first combination number according to a oscillating signal generated by an oscillation circuit;
    a receiver, for receiving from the pair of conductors of the transmission line a second data generated by a second scrambler of a transceiver, comprising a descrambler for descrambling the second data with a plurality of second registers characterized by a second combination number; and
    a controller, coupled to the transmitter and the receiver, for configuring the oscillation circuit for adjusting the frequency of the oscillating signal so that a frequency difference existed between the frequency of the oscillating signal and a transmission frequency of the transceiver when a combination number difference between the first combination number and the second combination number locates in a predetermined range and/or equals to a predetermined value;
    wherein the first scrambler and the second scrambler have the same scrambler generator polynomial, the controller configures the values of the first registers to be characterized by a third combination number when the first combination number difference locates in a predetermined range and/or equals to a predetermined value, there is a second combination number difference between the third combination number and the second combination number, and the difference between the second combination number difference and the predetermined range and/or the predetermined value is less than the difference between the first combination number difference and the predetermined range and/or the predetermined value.

7. The communication device of claim 6, wherein the controller configures the frequency of the oscillating signal to be substantially the same as the transmission frequency of the transceiver when the combination number difference locates in the predetermined range and/or equals to the predetermined value.

8. The communication device of claim 6, wherein the controller compares the first data and the second data and/or compares the values of the first registers and the values of the second registers for generating the combination number difference.

9. A communication method, comprising:
    transmitting to a pair of conductors of a transmission line a first data generated by a first scrambler with a plurality of first registers characterized by a first combination number;
    receiving from the pair of conductors of the transmission line a second data generated by a second scrambler;
    descrambling the second data with a descrambler with a plurality of second registers characterized by a second combination number;
    adjusting the values of the first registers according to the first combination number, the second combination number, and/or a first combination number difference between the first combination number and the second combination number; and
    configuring the values of the first registers to be characterized by a third combination number when the first combination number difference locates in a predetermined range and/or equals to a predetermined value;
    wherein there is a second combination number difference between the third combination number and the second combination number, and the difference between the second combination number difference and the predetermined range and/or the predetermined value is less than the difference between the first combination number difference and the predetermined range and/or the predetermined value.

10. The communication method of claim 9, further comprising:

comparing the values of the first registers and/or the first data with a first value for generating the first combination number;

comparing the values of the second registers and/or the second data with a second value for generating the second combination number; and comparing the first combination number difference according to the first combination number and the second combination number.

11. The communication method of claim 10, further comprising:

configuring the first value and the second value to be substantially the same.

12. The communication method of claim 9, further comprising:

comparing the first data and the second data and/or comparing the values of the first registers and the values of the second registers for generating the first combination number difference.

13. The communication method of claim 9, further comprising:

comparing the first data and the values of the second registers and/or comparing the values of the first registers and the second data for generating the first combination number difference.

14. A communication method, comprising:

transmitting to a pair of conductors of a transmission line a first data generated by a first scrambler with a plurality of first registers characterized by a first combination number according to a oscillating signal generated by an oscillation circuit;

receiving from the pair of conductors of the transmission line a second data generated by a second scrambler of a transceiver;

descrambling the second data with a descrambler with a plurality of second registers characterized by a second combination number;

configuring the oscillation circuit for adjusting the frequency of the oscillating signal so that a frequency difference existed between the frequency of the oscillating signal and a transmission frequency of the transceiver when a combination number difference between the first combination number and the second combination number locates in a predetermined range and/or equals to a predetermined value; and configuring the values of the first registers to be characterized by a third combination number when the first combination number difference locates in a predetermined range and/or equals to a predetermined value;

wherein there is a second combination number difference between the third combination number and the second combination number, and the difference between the second combination number difference and the predetermined range and/or the predetermined value is less than the difference between the first combination number difference and the predetermined range and/or the predetermined value.

15. The communication method of claim 14, further comprising:

configuring the oscillation circuit to generate the oscillating signal with the frequency substantially the same as the transmission frequency of the transceiver when the combination number difference locates in the predetermined range and/or equals to the predetermined value.

16. The communication method of claim 14, further comprising:

comparing the first data and the second data and/or compares the values of the first registers and the values of the second registers for generating the combination number difference.

* * * * *